United States Patent [19]
Lidl

[11] 3,712,778
[45] Jan. 23, 1973

[54] MOLD FOR THE CASTING FOR FOAMABLE SYNTHETIC RESINS

[75] Inventor: Rolf Lidl, 8000 Munich 12, Germany

[73] Assignee: Krauss-Maffei AG, Munich-Allach, Germany

[22] Filed: Dec. 10, 1970

[21] Appl. No.: 96,749

[30] Foreign Application Priority Data

Dec. 11, 1969  Germany...................P 19 62 008.7

[52] U.S. Cl. ...............................................425/242
[51] Int. Cl. ..................................................B29f 1/00
[58] Field of Search......18/42 D, 30 WM, 30 WN, 30 WD, 18/30 NA, 30 NM, 30 NR, 30 RM, DIG. 16, 5 P, 34 R, 30 GM, 30 GA, 12 DS; 138/46; 425/242, 247

[56] References Cited

UNITED STATES PATENTS

| | | | |
|---|---|---|---|
| 3,244,781 | 4/1966 | Covington, Jr. et al. | 18/12 DS |
| 3,428,289 | 2/1969 | Heckrotte et al. | 18/42 D |
| 3,266,099 | 8/1966 | Bucy | 18/42 D |

FOREIGN PATENTS OR APPLICATIONS

| | | | |
|---|---|---|---|
| 760,880 | 1967 | Canada | 18/42 D |
| 121,942 | 1948 | Sweden | 18/30 WD |

*Primary Examiner*—J. Spencer Overholser
*Assistant Examiner*—David S. Safran
*Attorney*—Karl F. Ross

[57] ABSTRACT

A mold or form for the casting of foamable or expandable synthetic-resin materials and especially multicomponent materials, containing two or more interreacting substances adapted to copolymerize to form the cast body, has a mold cavity and an inlet passage communicating between this cavity and the nozzle of the molding machine (e.g. an injection-molding apparatus). The passage has an inlet portion of generally circular cross-section and fans outwardly to a discharge portion in the form of a narrow slit of a height of 0.2 to 2mm extending over the major portion of the width of the cavity to the point at which the discharge slit communicates with the latter. In addition, the height of the passage tapers downwardly to impart a wedge configuration in a plane of the passage perpendicular to the major dimension of the slit.

10 Claims, 3 Drawing Figures

PATENTED JAN 23 1973  3,712,778

INVENTOR:
Rolf Lidl

BY

Karl F. Ross
Attorney 3,712,778

MOLD FOR THE CASTING FOR FOAMABLE SYNTHETIC RESINS

FIELD OF THE INVENTION

My present invention relates to a mold or form for the casting of synthetic-resin materials and, especially, foamable or expandable synthetic-resin compositions consisting of two or more components adapted to interact, e.g., copolymerize during the curing of the cast body; more particularly, the invention relates to a mold or form of the character described which is provided with an improved inlet passage for connecting the mold cavity with the nozzle of a common source of the components.

BACKGROUND OF THE INVENTION

In the art of forming castings of foamable multi-component synthetic-resin compositions, it has been the practice heretofore to provide a mold containing a mold cavity and a passage of generally circular cross-section opening directly (without transitional configurations) into the mold cavity and communicating with a source of the multicomponent composition. For the purposes of the present invention, a "foamable multicomponent composition" should be understood as including any synthetic-resin material consisting of two or more components capable of undergoing a chemical reaction, e.g., copolymerization, terpolymerization, cross-linking, in the curing of the finished product and which may contain a foaming agent or may be self-foaming. The foaming agent thus may be a gas which is held under pressure until the composition is introduced into the mold cavity and then is permitted to expand, may be a liquid at some point in the handling of the composition which gasifies in the mold cavity, or may be a gas, e.g., carbon dioxide, which is released as a result of chemical action in the composition, for example, the chemical reaction between the components. A typical system is a polyurethane-molding process in which a di-isocyanate or polyisocyanate is copolymerized with a dihydric or polyhydric alcohol in the presence of a foaming agent of the character described.

Also, for the purposes of the present invention, a "source" of the foamable multicomponent synthetic resin can be considered to be the mixing system described and claimed in copending application Ser. No. 49,026 filed 23 June 1970 and entitled SCAVENGING SYSTEM FOR INJECTION MOLDING MACHINES (now U.S. Pat. No. 3,674,398 issued 4 July 1972). In this application, I have described, with others, an arrangement in which the several components can be combined for supply through a common duct to the mold. Hence, when I refer in the present case to a common source of the components or to the source of the multicomponent foamable composition, it is to be understood that this source will generally include a single duct, e.g., of circular cross-section and possibly fitted for convenience with a tapered nozzle through which the two or more components are simultaneously delivered to the mold.

As already noted, conventional mold systems for this purpose are provided with an inlet passage which can communicate between the source of the foamable composition and the mold cavity and which is of circular cross-section over its entire length. In other words, at the point at which the inlet passage opens into the mold cavity, the discharge aperture of the passage has a circular configuration, while the inlet end of the passage is likewise provided with an aperture of circular configuration, while the cross-section remains substantially constant and circular over the entire length of the passage.

Numerous problems have been encountered in the molding of foamable multicomponent compositions as will be elucidated hereinafter. Firstly, however, it is important to recognize what type of problem can be encountered. If air, for example, is entrained into the mold cavity with the composition, it is seldom distributed uniformly so that the resulting inclusion takes the form of a large air cell in the finished product, detrimentally affecting the quality of the latter. If there is unduly long contact and mixing between the components of the composition, moreover, they may react in the inlet passage so that a heterogenous substance is introduced into the mold and again the product may be detrimentally affected.

With the circular-cross-section passages mentioned above, it has been found that vortex formation and turbulence is unavoidable and air is readily drawn into the stream of synthetic resin introduced into the mold. To avoid this, it has been proposed to provide high-quality finishing of the wall of the inlet passage (microfinishing) and to round outwardly the outlet mouth of the passage, thereby reducing the turbulence. In practice, these procedures have been found to be unavailing because of the low-viscosity characteristics of the composition. In fact, the compositions contemplated in accordance with the present invention have a particularly low kinematic viscosity so that the system tends to operate at high critical Reynolds numbers and thus is particularly prone to turbulence inducing disturbances which may arise, for example, from spontaneous reactions in the inlet passage. These disturbances increase when the composition also includes a foaming or blowing agent. Attempts to avoid this disadvantage by reducing the velocity of the composition, bring to the fore the possibility of additional interaction between the components with the disadvantages noted earlier.

Mention should also be made of the use of spreading inlets for the distribution of synthetic resins to a plurality of mold cavities or to a plurality of regions of a single mold cavity in a system which, in effect, involves a manifolding type of distribution of the synthetic resin. However, these attempts with individual outlets along the length of the narrow manifold and are complicated by the same disadvantages as the central feed system mentioned earlier.

OBJECTS OF THE INVENTION

It is an important object of the present invention to provide an improved mold or form, especially for the casting of foamable multicomponent synthetic-resin compositions, whereby the aforementioned disadvantages can be obviated.

It is another object of this invention to provide an improved mold for the purposes described in which the turbulence problem can be reduced or eliminated, premature interaction of the components restricted or obviated, and high-quality foammolded bodies can be obtained.

It is also an object of my invention to provide an improved inlet passage for delivering a multicomponent synthetic-resin composition to the mold cavity which maintains the homogeneity of the composition until it reaches the cavity and ensures uniform distribution of the composition therein, which is of low cost, which can be readily cleared of residual synthetic resin and which affords improved results without the problems hitherto encountered.

SUMMARY OF THE INVENTION

These objects and others which will become apparent hereinafter, are attained, in accordance with the present invention, with an improved passage connecting a source of the multicomponent synthetic-resin composition with the mold cavity and which has a configuration such that, with constant flow velocity over the entire passage, the calming and passivation of the composition is increased progressively in the direction of the discharge mouth. In other words, instead of the turbulence or disturbances of the normal laminar-flow pattern occurring uncontrolledly at the mouth of the inlet passage or with varying degrees during its length, I provide a passage which is so constructed and dimensioned that there is a progressive increase in passivation or calming over a major portion of the length of the passage and preferably over its entire length, to the discharge mouth of the passage, while nevertheless maintaining substantially constant the throughflow velocity of the composition. Most surprisingly, this progressive decrease in the tendency toward disturbance of the composition is afforded by thinning out the stream and the composition remains fully homogeneous as it is delivered to the mold cavity and does not create air inclusions in the finished product.

The improved system of the present invention thus comprises a mold for the forming of foamed multicomponent synthetic-resin compositions which is provided, between the mold cavity and an inlet mouth communicating with a source of the multicomponent composition, of an inlet passage which terminates in a discharge mouth at the mold cavity in the form of a slit which extends over all or at least a major fraction of the major dimension of the mold cavity at the side of the latter at which the inlet passage opens. Between the circular inlet mouth and the slit-shaped discharge mouth, the inlet passage is provided with a substantially continuous transition configuration in which, substantially over the entire length of the inlet passage, the cross-sectional area (flow cross-section) remains constant. At least over the major part of the length of the inlet passage, the modification of the cross-sectional configuration from one portion to the adjacent portion remains relatively small, such that the change in direction of each wall of the passage transverse to the throughflow direction between any two points is not greater than the distance between these points. In other words, if a wall of the passage flares between points A and B outwardly transverse to the direction of flow of the composition through a distance $\Delta d$ as measured in projection on a plane perpendicular to the flow direction, the distance $\Delta l$ between these points must be defined by the relationship $\Delta d \leq \Delta l$. The same holds true with respect to any change in the direction of a passage wall.

It should be noted, moreover that the discharge slit of the present invention opens directly into the mold cavity and is unobstructed. When the aforementioned major dimension of the mold cavity at its side communicating with the inlet passage exceeds the length of the slit, I may round out the discharge mouth so that the side of the mold cavity is tangential to the mouth of the slit.

The invention is based upon the fact noted earlier that it is possible, by transforming the path of this relatively flowable synthetic-resin composition from a circular cross-section to a slit-shaped cross-section, to alter the friction forces which act upon the stream and thereby induce quiescence while maintaining substantially laminar flow conditions over the major part of the cross-section of the stream. The reynolds number at the inlet is reduced to a fraction of its former value at the exit slit.

Advantageously, the major portion of the length of the inlet passage is fanned outwardly in the direction of the discharge slit while the flow cross-section is maintained constant, the portions of the inlet passage between the source and the fan-shaped portion and the slit constituting only minor fractions of the overall length of the inlet passage. The widening intermediate portion of the passage forms a transition between the circular cross-section and the slit and lies generally in the plane of the slit but narrows progressively in the direction of the slit with a wedge-shaped configuration. It has been found that the angle at which the intermediate portion of the passage flares out is critical and should lie between 30° and 90°, preferably between 30° and 60°.

DESCRIPTION OF THE DRAWING

The above and other objects, features and advantages of the present invention will become more readily apparent from the following description, reference being made to the accompanying drawing in which.

Figure 1:
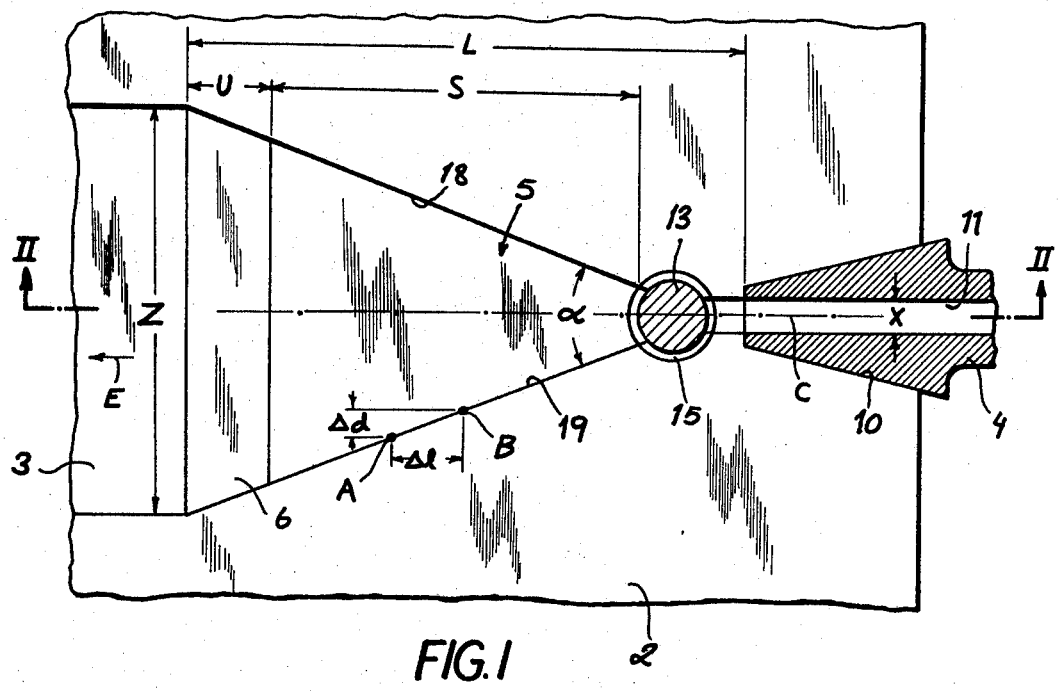
FIG. 1 is a partial plan view, partly in cross section along the separating plane of the upper and lower mold halves, of a mold embodying the present invention.

The mold of the present invention comprises a pair of separable mold halves including an upper mold half 2 and a lower mold half 1, together defining a mold cavity 3. Along the side of the mold cavity at which the synthetic resin is supplied, the cavity has a major dimension (e.g. length or width) Z and a height Y (FIGS. 1 and 2).

Remote from the mold cavity, the mold halves 1 and 2, upon closure, define a frustoconical socket 10 receiving a nozzle 4 of an injecting apparatus including a source of a multicomponent foamable synthetic-resin composition, as described earlier, which includes a blowing or foaming agent. The nozzle 4 thus has a passage 11 through which the components of this composition are delivered in common. The passage 11 is of circular cross section with a diameter X.

Figure 2:
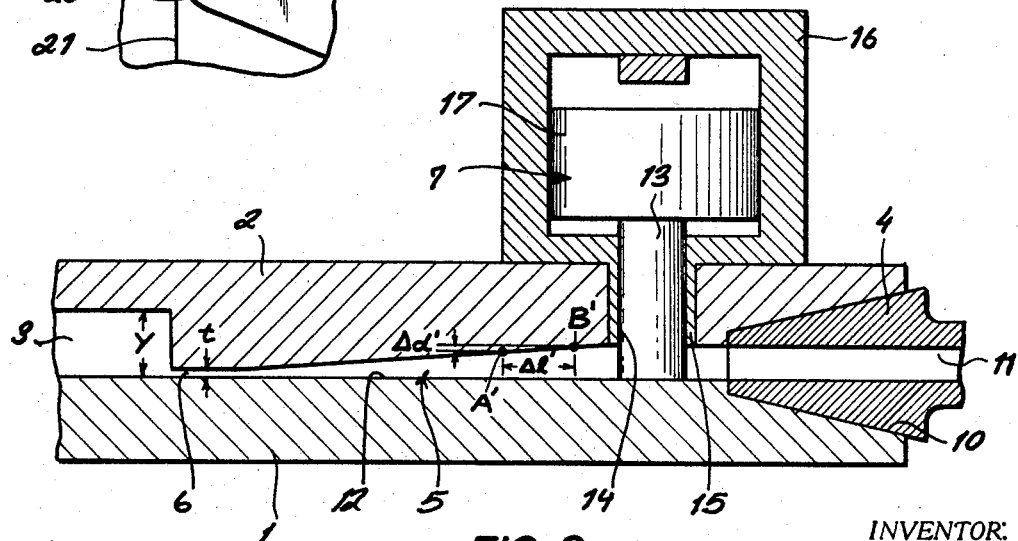
FIG. 2 is a cross-sectional view taken generally along the line II — II of FIG. 1.

Between the nozzle 4 and the mold cavity 3, I provide an inlet passage 5 having a length L as best seen in FIGS. 1 and 2. At the discharge mouth of the inlet passage into the mold cavity 3, I provide a narrow slit 6 of a length U and a thickness or height $t$ ranging between 0.2 and 2 mm. The slit 6 has a length Z equal to the major dimension of the mold cavity 3 at the inlet side of the latter, although its open height $t$ may be a small fraction, e.g. between 5 and 20 percent, of the height Y of the mold cavity into which the slit opens. The width U of the slit may range from $2t$ to $20t$ and in any event is a minor fraction of the overall length S of the intermediate portion of the passage. The slit 6, moreover, has a rectangular aperture at its junction with the mold cavity 3 and a cross-sectional area substantially equal to the cross-sectional area of the bore 11 mentioned earlier.

A slit height $t$ between 0.2 and 2 mm also has the advantage that, upon hardening of the synthetic resin mass, the excess material from the inlet passage can be readily broken off and any unsightly appearance of the break rendered practically unnoticeable. It has been found to be especially advantageous in this regard when the mold cavity provides a massive edge zone of the molded body having a thickness which is greater than the thickness of the web remaining in the slit. An effective removal of this web also results when the slit 6 merges without any discontinuities with at least one mold half. In the embodiment shown in the drawing, the floor 12 of the inlet passage 5 continues as the floor of the mold cavity 3.

The inlet passage 5 is provided with a valve or closure arrangement 7 adapted to block same close to its inlet end. The valve 7 comprises a plunger 13 shiftable in a bore 14 perpendicularly to the axis C of the passage 5 and to the plane of the slit 6. The bore 14 is provided on a neck 15 of a cylinder 16 which is mounted upon the upper mold half and receives the piston 17 to which the plunger 13 is affixed. Suitable pneumatic means or hydraulic means, not shown, may be used to actuate the closure device. Between the closure device 7 and the nozzle 4, I may provide an inlet mouth 8 of circular cross section which is coaxial with the bore 11 and of the same diameter X. Hence this portion of the inlet passage 5 which may have a length $L-(U+S)$ which is small by comparison with L and S, will have a flow cross section $D = \pi X^2/4$ corresponding to the flow cross section $D' = Z \cdot t$ whereby the flow velocity of the synthetic resin is constant over the entire length of the passage. The width U may range between 3S and 10S, with L being dimensioned accordingly.

Over the intermediate portion of the length of the inlet passage 5, which extends over the distance S as indicated in FIG. 1, the inlet passage is flared or fans outwardly in the direction of the slit 6 and in the plane of the latter to form a continuous transition between the circular-section portion 8 and the slit 6. The angle $\alpha$ between the lateral walls 18 and 19, which diverge uniformly on opposite sides of the axis C, is preferably between 45° and 60° although a somewhat larger angle may be used when L is decreased to reduce the losses of the synthetic resin material in the inlet passage. However, in no event should the angle $\alpha$ exceed 90° and experiments have shown that angles above 90° detrimentally affect the distribution of the composition to the mold cavity. An important aspect of the present invention is that, during the fanning-out of the channel 15 in the plane of the slit 6, the cross section is reduced by, for example, a convergence of the upper surface 9 toward the floor 12 as best seen in FIG. 2, whereby the channel has a wedge-like appearance. Between any two points A and B, for example, or A', B', the change in direction traversed to the flow path (arrow E) may be represented at $\Delta \underline{d}$ while the distance between the points A and B is represented at $\Delta l$. In the case of the points A' and B', the corresponding dimensions are $\Delta \underline{d}'$ and $\Delta l'$. According to an important feature of the present invention $\Delta \underline{d} \leq \Delta l$ and $\Delta \underline{d}' \leq \Delta l'$.

Figure 3:
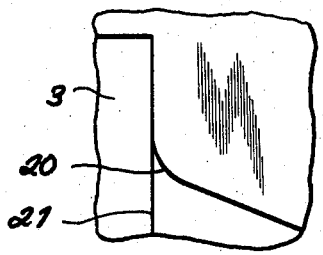
FIG. 3 is a detail view, in plan of the junction between the inlet passage and the mold cavity according to another feature of the present invention.

In the embodiment illustrated, the inlet passage 5 is constituted as a channel-like recess in the surface of the upper mold half 2 while the lower form half 1 covers this recess. A separation of the two mold halves readily exposes the entire inlet passage to allow the latter to be freed from residues conveniently and rapidly.

Where it is not possible to have the length of the slit 6 coincide with the major dimension of the mold cavity 3 over its entire side communicating with the inlet passage, the system illustrated in FIG. 3 is used. From this Figure it will be apparent that the inlet passage 5 is rounded and flared outwardly at 20 so that the surface 21 of the mold cavity lies tangential thereto. Edge vortexes are thereby avoided and unsightly formations on the surface of the finished body are avoided.

The improvement described and illustrated is believed to admit of many modifications within the ability of persons skileed in the art, all such modifications being considered within the spirit and scope of the invention except as limited by the appended claims.

I claim:

1. A mold for the forming of synthetic-resin bodies, comprising means forming a mold cavity, and means defining an inlet passage communicating with said cavity along one side thereof and with a source of synthetic resin, said source having a bore opening into an inlet mouth of said inlet passage and of substantially circular cross-section, said inlet passage terminating at said mold cavity in a substantially planar slit of substantially rectangular cross-section opening directly into the mold cavity, said inlet passage having a transitional configuration intermediate said slit and said inlet mouth comprising at least one pair of walls diverging from one another toward opposite longitudinal ends of said slit and a pair of other walls converging toward one another in the direction of the longitudinal sides of said slit, said divergence of said one pair of walls and said convergence of said other walls being such that the change in a dimension of the inlet passage transverse to the direction of flow of the synthetic resin therethrough over any interval of length of the inlet passage is at most equal to such interval of length.

2. The mold defined in claim 1 wherein said inlet passage has an intermediate portion connecting said inlet mouth and said slit which fans out in the plane of said slit to the cross-section thereof uniformly and in the plane of said slit.

3. The mold defined in claim 2 wherein said intermediate portion of said passage has a wedge-like convergence in the direction of said slit in a plane perpendicular to the plane of said slit.

4. The mold defined in claim 3 wherein said intermediate portion fans out in the direction of said slit at an angle between 30° and 90°.

5. The mold defined in claim 1 wherein the flow cross-section over substantially the entire length of said passage between the said inlet mouth and said slit is substantially constant.

6. The mold defined in claim 5 wherein said mold is formed with a pair of separable mold halves, one of said mold halves being provided with a fan-shaped recess defining said inlet passage while the other mold half forms a cover therefor.

7. The mold defined in claim 1 wherein said slit has a thickness between 0.2 and 2 mm.

8. The mold defined in claim 1 wherein said slit has a length less than the major dimension of said cavity at said side and the mouth of said slit is rounded out such that said side is tangential thereto.

9. The mold defined in claim 1 wherein said slit opens into said cavity at the lowest point thereof.

10. A mold for the forming of synthetic-resin bodies, comprising means forming a mold cavity, and means defining an inlet passage communicating with said cavity along one side thereof and with a source of synthetic resin, said source having a bore opening into an inlet mouth of said inlet passage and of substantially circular cross-section, said inlet passage terminating at said mold cavity in a substantially planar slit opening directly into the mold cavity and having a transitional configuration intermediate said slit and said inlet mouth so constructed and arranged that the change in a dimension of the inlet passage transverse to the direction of flow of the synthetic resin therethrough over any interval of length of the inlet passage is at most equal to such interval, said mold cavity and inlet passage being defined between a pair of separable mold halves, one of said mold halves being provided with recesses defining said cavity and said passage while the other mold half forms a cover for said recesses, said slit having a length equal at least to a major fraction of the major dimension of said recess along said side and a thickness of 0.2 to 2 mm and only a minor fraction of the thickness of said mold along said side, said passage having an intermediate portion fanning from said inlet mouth to said slit outwardly in the plane of said slit at an angle of 30° to 60° and of a length equal to a major fraction of the overall length of said passage, the thickness of said intermediate portion progressively diminishing in the direction of said slit, the flow cross-section of said inlet mouth and of said slit being equal.

* * * * *